(12) United States Patent
Brammell

(10) Patent No.: US 9,266,709 B2
(45) Date of Patent: Feb. 23, 2016

(54) SYSTEMS AND METHODS FOR ON-SITE MIXING AND DISPENSING OF A REDUCING AGENT SOLUTION FOR USE WITH A DIESEL CATALYTIC CONVERTER

(76) Inventor: Jack R. Brammell, San Antonio, TX (US)

( * ) Notice: Subject to any disclaimer, the term of this patent is extended or adjusted under 35 U.S.C. 154(b) by 521 days.

(21) Appl. No.: 12/952,081

(22) Filed: Nov. 22, 2010

(65) Prior Publication Data
US 2011/0126514 A1 Jun. 2, 2011

Related U.S. Application Data

(60) Provisional application No. 61/263,268, filed on Nov. 20, 2009.

(51) Int. Cl.
| | | |
|---|---|---|
| *F01N 3/00* | (2006.01) | |
| *F01N 3/10* | (2006.01) | |
| *B67D 7/02* | (2010.01) | |
| *B67D 7/74* | (2010.01) | |
| *G05D 11/13* | (2006.01) | |

(52) U.S. Cl.
CPC *B67D 7/02* (2013.01); *B67D 7/744* (2013.01); *G05D 11/132* (2013.01); *F01N 2610/02* (2013.01)

(58) Field of Classification Search
CPC . F01N 2610/02; F01N 3/2066; G05D 11/132; B67D 7/02; B67D 7/744
USPC ............................. 60/274, 286, 295, 301, 303
See application file for complete search history.

(56) References Cited

U.S. PATENT DOCUMENTS

| | | | |
|---|---|---|---|
| 5,943,858 A | 8/1999 | Hofmann et al. | |
| 6,063,350 A | 5/2000 | Tarabulski et al. | |
| 6,290,386 B1 | 9/2001 | Baumgartl et al. | |
| 6,502,390 B2 * | 1/2003 | Goerigk et al. | 60/286 |
| 6,672,755 B1 | 1/2004 | Potter et al. | |
| 6,725,653 B2 * | 4/2004 | Brown et al. | 60/297 |
| 6,887,449 B2 * | 5/2005 | Brooks et al. | 423/358 |
| 6,966,688 B2 | 11/2005 | Lins | |
| 7,467,512 B2 | 12/2008 | Nishina et al. | |
| 7,481,049 B2 | 1/2009 | Huber et al. | |

(Continued)

FOREIGN PATENT DOCUMENTS

| | | |
|---|---|---|
| WO | 9117814 A1 | 11/1991 |
| WO | 2005024232 A1 | 3/2005 |

(Continued)

*Primary Examiner* — Jesse Bogue
*Assistant Examiner* — Diem Tran
(74) *Attorney, Agent, or Firm* — Kammer Browning PLLC

(57) ABSTRACT

Systems and methods for mixing and dispensing an aqueous urea solution at the point of delivery to diesel powered vehicles. A stand alone terminal or modular unit that mixes and dispenses the dilute solution on an as-needed batch basis. Each delivery terminal includes a dry or concentrated liquid urea reservoir, and a metering urea dispenser, along with a parallel demineralized water reservoir and a metering water dispenser. The demineralized water may be provided directly from an external source or the system may include a demineralizing component. The metered dispensing of the urea and the water into a mixing tank to produce the aqueous urea solution (AUS) is controlled through an electronic control system. From the mixing tank the system directs the solution through a sediment filtration system before retaining the mixed and filtered solution in a terminal holding and dispensing tank.

7 Claims, 3 Drawing Sheets

(56) References Cited

U.S. PATENT DOCUMENTS

2002/0044897 A1    4/2002    Kakwani et al.
2006/0184307 A1    8/2006    Kosaka
2007/0163673 A1    7/2007    Kallberg
2008/0295497 A1    12/2008    Kornherr et al.

FOREIGN PATENT DOCUMENTS

WO    2007014728 A1    2/2007
WO    2007017159 A1    2/2007
WO    2007049042 A1    5/2007
WO    2009103569 A1    8/2009

\* cited by examiner

SYSTEMS AND METHODS FOR ON-SITE MIXING AND DISPENSING OF A REDUCING AGENT SOLUTION FOR USE WITH A DIESEL CATALYTIC CONVERTER

CROSS REFERENCES TO RELATED APPLICATIONS

This application claims the benefit under Title 35 United States Code §119(e) of U.S. Provisional Application 61/263,268 filed Nov. 20, 2009, the full disclosure of which is incorporated herein by reference.

BACKGROUND OF THE INVENTION

1. Field of the Invention

The present invention relates generally to systems and methods for making and dispensing chemical solutions for use in conjunction with internal combustion engines. The present invention relates more specifically to systems and methods for making a dilute chemical solution from a liquid solvent (water) and either a dry composition (urea) or a concentrated solution (urea), at a point immediately prior to dispensing the dilute solution into a vehicle powered by an internal combustion (diesel) engine.

2. Description of the Related Art

Efforts are continuously being made to reduce emissions associated with the burning of hydrocarbon fuels in internal combustion engines. At the same time, efforts are being made to increase the fuel efficiency of these internal combustion engines. Recent efforts to improve the fuel efficiency of diesel engines have been successful but often at the cost of increasing emissions, especially nitrogen oxide ( ) emissions.

There are a variety of nitrogen oxide ( ) reducing systems that have been and currently are being developed for use in conjunction with diesel engines. One of these reducing systems is a urea based reducing solution, one type of which is marketed under the trade name AdBlue®. These systems are designed to reduce the pollutant emissions associated with the burning of diesel fuel in vehicular engines. These reducing systems were developed in response to a number of the newer processes that give diesel engines greater fuel economy but which as a result create extra emissions of certain pollutants. High compression ratios and lean air-fuel mixtures result in higher combustion temperatures, which in turn result in more nitrogen oxides and particulate matter being released into the gaseous exhaust system. While the particulate matter may typically be controlled with higher injection pressures and particulate filters, limiting the emissions can be more problematic.

One basic process for reducing emissions involves the injection of an aqueous urea solution (AUS) from a stored container on the vehicle into the exhaust stream. This process initiates a chemical reaction which, in conjunction with an additional catalytic converter, converts a significant percentage of the into water vapor and nitrogen. In general, the first stage catalytic converters utilized in conjunction with diesel engines initially trap the and later release it into a second converter which then converts it into nitrogen ( ) and water ( ). This basic system removes much of the , but through the addition of ammonia ( ) in the form of the AUS, a more complete conversion can be achieved. In other words, the exhaust system associated with a diesel engine will typically first include a diesel oxidation catalyst which reduces the amounts of carbon monoxide and hydrocarbons released from the exhaust. A catalytic converter begins the initial removal of oxides of nitrogen. Subsequently, a particulate filter traps and stores soot particles, burning them off when the filter gets full. Finally, in addition to the above, a selective catalytic reduction (SCR) catalytic converter takes the remaining nitrogen oxides and converts them to nitrogen and water by the addition of the AUS injected into the exhaust stream to enable the conversion.

A typical variety of AUS marketed under the trade name AdBlue® comprises AUS32 (aqueous urea solution 32.5%) and is used in the above described process referred to as selective catalytic reduction (SCR) to reduce emissions of oxide and nitrogen from the exhaust of diesel vehicles. This particular AUS solution is a 32.5% solution of high purity urea in demineralized water that is clear, non-toxic, and generally safe to handle. However, the solution can be corrosive for a number of metals and must be stored and transported using containers, conduits, valves, and fittings made up of certain non-corrosive materials. The AUS is typically carried onboard SCR equipped vehicles in specially designed tanks and is dosed into the SCR system at a rate typically equivalent to three to five percent of diesel consumption. This low dosing rate ensures long re-fill periods and minimizes the special tank's impact on chassis space. On highway SCR systems are currently in use throughout much of Europe, Australia, New Zealand, and the Far East.

The U.S. Environmental Protection Agency (EPA) 2010 legislation, which sets new limits on emissions, will, because of these new limits, require North American trucks to be equipped with SCR systems after 2010. In North America the AUS type reducing agent is commonly referred to as diesel exhaust fluid (DEF). A number of trucking industry manufacturers have already developed branded SCR systems that use aqueous urea solutions such as a product marketed under the brand name BlueTec®.

Most SCR systems currently in use and in development tend to be sensitive to chemical impurities in the urea solution. It is therefore important that high standards of quality are maintained for the composition that is delivered into the vehicle and for the delivery system itself. In general (and more specifically, throughout Europe), the use of SCR technologies has initiated a supply infrastructure that provides delivery of the manufactured solution to service stations that likewise provide the diesel fuel for the vehicles. In general, the sale and delivery of the AUS is made in canisters of five or ten liters, although larger quantities are sometimes delivered in two hundred liter drums. Deliveries to fueling depots are sometimes made in bulk tankers, not unlike the delivery of the diesel fuel itself.

In any case, the delivery of the AUS to a fuel station or depot where it is finally delivered to the vehicle that uses it is almost always made in liquid form, i.e., already mixed into a dilute solution. Unfortunately, it is this dilute solution that provides the most corrosive composition to the various metals that it might come into contact with and which requires the use of special storage containers and dispensing conduits. In contrast, the urea in its dry condition is relatively easy to transport and requires little in the way of special handling. In a similar manner, urea in a concentrated liquid condition can significantly reduce transportation cost, simply by reducing the quantity that must be transported (and the associated packaging).

It would be desirable, therefore, to deliver the much less corrosive compound, namely the dry urea powder or pellets, to a point where it might be stored without as significant a concern for its corrosive effects. Alternatively, it would be desirable to deliver the highly concentrated solution of urea to a point where it might be stored in much more manageable quantities. It would be desirable if the aqueous urea solution (AUS) could then be mixed and manufactured on-site to be immediately dispensed into the vehicle that will utilize the reducing agent. It would be desirable if this mixing of the dilute solution and the subsequent dispensing of the dilute solution could occur on an as-needed basis as opposed to requiring the maintenance of a supply that degrades over time, and potentially causes corrosive effects throughout the storage and delivery system. It would be desirable to avoid and/or minimize shipping and handling contamination risks and costs associated with the distribution of a solution versus the on-site manufacturing (blending) thereof.

SUMMARY OF THE INVENTION

In fulfillment of the above stated objectives, the present invention provides systems and methods for the mixing and dispensing of an aqueous urea solution at the point of delivery to the diesel powered vehicles that require the use of such a solution. In contrast to the existing methods of delivering the pre-mixed dilute solution to fuel depots and maintenance facilities for dispensing into the vehicles, the present invention provides a stand alone terminal or modular unit that mixes and dispenses the solution on an as-needed batch basis. Each delivery terminal includes a dry urea material reservoir or a concentrated liquid urea reservoir and a metering urea dispenser, along with a parallel demineralized water reservoir and a metering water dispenser. The demineralized water may be provided directly from an external source or the system may include a demineralizing component (a water softener) that itself is connected to an external water source.

The metered dispensing of the urea and the water into a mixing tank to produce the aqueous urea solution (AUS) is controlled through an operational control system that activates and runs the metered dispensing components and the various valves associated with the system to appropriately dispense, mix, and hold the necessary quantities of demineralized water, dry urea (or concentrated liquid), and the resultant mixed solution. From the mixing tank the system directs the solution (AUS) through a sediment filtration system before retaining the mixed and filtered dilute solution in a terminal holding and dispensing tank. From the holding and dispensing tank the final user (the diesel vehicle operator) may batch dispense the necessary quantity of AUS into the vehicle for use in conjunction with the selective catalytic reduction (SCR) system of the diesel powered vehicle.

In summary, therefore, the systems and methods of the present invention seek to address at least four specific problems that are present in the field. First, the presently described system eliminates, or at least reduces, concerns surrounding the corrosive character of the AUS compound by maintaining it in its component form up to the point of dispensing into the diesel powered vehicle. Second, the method of the present invention eliminates, or significantly reduces many of the transportation costs associated with the delivery of the fully formulated solution to a fuel depot or other dispensing station. Third, in the process of producing the solution on-site, the systems and methods of the present invention eliminate, or significantly reduce, the costs associated with packaging the solution for sale and delivery. Finally, the systems and methods of the present invention eliminate, or significantly reduce, the need for a number of additional dispensing devices, such as those that might be required to dispense the solution from fifty-five gallon drums or the like. The above described problems, addressed by the present invention, are not adequately addressed with the delivery and dispensing of the ready-made dilute solution that comes from a chemical or other manufacturing (blending) facility. The present invention addresses each of these problems by eliminating or mitigating the difficulties and significant expenses associated with handling, packaging, and transporting the product up to the point in the process where it is directly dispensed into the motor vehicle.

DETAILED DESCRIPTION OF THE PREFERRED EMBODIMENTS

Figure 1:
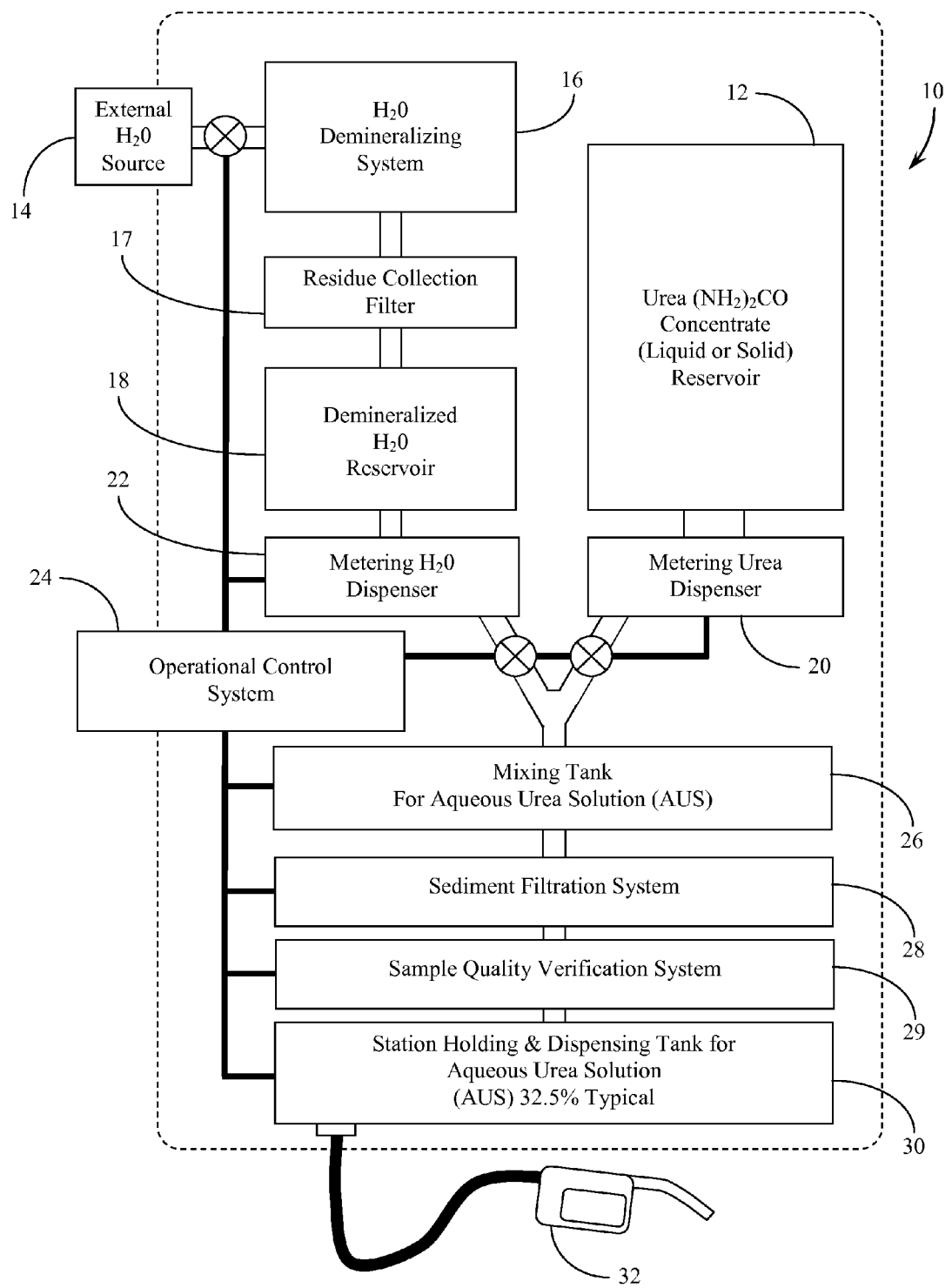
FIG. 1 is a schematic block diagram showing the essential components of the stand alone mixing and dispensing system of the present invention.

The systems and methods of the present invention are generally disclosed by reference to the attached Drawing Figures, within which each of the components are commonly referenced as follows:

COMPONENT LISTING 10 mixing and dispensing unit
12 concentrated urea reservoir
14 external source
16 de-mineralizing system
18 demineralized reservoir
20 metering urea dispenser
22 metering dispenser
24 operational control system
26 mixing tank for aqueous urea solution (AUS)
28 sediment filtration system
29 sample quality verification system
30 station holding and dispensing tank for AUS
32 dispensing valve/nozzle
38 urea reservoir access lid
40 mixing/dispensing terminal
42 reservoir tank section of terminal
44 electronic control section of terminal
46 terminal base support structure
48 dispensing hose connector
50 dispensing hose
52 dispensing nozzle
54 electronic control data input panel
56 dispensing tank level indicator
58 external source electrical supply
60 external source water supply
70 diesel fuel depot island
72 diesel fuel pump
74 diesel fuel pump
76 diesel fuel pump
78 diesel fuel pump
80 AUS dispensing system
82 AUS dispensing system
84 urea reservoir access lid
86 diesel fuel dispensing hose
88 AUS dispensing hose
90 diesel powered vehicle (tractor)
92 diesel vehicle load (trailer)

Reference is made first to FIG. 1 for a schematic block diagram showing the essential components of the stand alone mixing and dispensing system of the present invention. In this block diagram the components are arranged in a manner to clarify their functional connections and not necessarily their physical positioning within the terminal structure of the present invention. The system is structured into an on-site mixing and dispensing unit 10 that is generally made up of a reservoir section, a mixing section, and a holding/dispensing section. The reservoir section includes urea concentrate (liquid or solid) reservoir 12 and demineralized water reservoir 18. The demineralized water required for the aqueous urea solution may be provided directly from an external source or, as shown in FIG. 1, through a built-in water demineralizing system 16 that is itself connected to external water source 14. A residue collection filter 17 may be positioned between demineralizing system 16 and demineralized water reservoir 18.

The mixing section of the system includes metering urea dispenser 20 and metering water dispenser 22. These metered dispensing components are controlled by operational control system 24 which, in the preferred embodiment comprises an electronic data processor and controller that activates and regulates the operation of the various valves, pumps, flow conduits, and motors associated with the overall operation of the system. The control system 24 directs the metered dispensing of the appropriate quantities of dry urea (or liquid concentrate) and demineralized water (at the appropriate flow rates) into aqueous urea solution mixing tank 26. Urea is highly soluble in water and therefore requires little in the way of mixing mechanism to achieve a homogenous solution. Mixing tank 26 may, however, in the preferred embodiment, include such mechanical stirrers, heaters, and other devices appropriate to produce a homogenous and relatively pure solution.

Finally, the holding/dispensing section of the overall unit 10 includes sediment filtration system 28 which receives the mixed solution from mixing tank 26 and directs it into holding and dispensing tank 30. From holding and dispensing tank 30 the AUS may finally be dispensed into an appropriate reservoir on the diesel powered vehicle (not shown) through dispensing valve/nozzle 32. As mentioned above, an objective of the present invention is to avoid many of the problems associated with the long term storage of AUS prior to use, both in terms of the deterioration of the quality of the solution over time and its tendency to corrode many types of metal fixtures and fittings.

The system of the present invention is therefore designed to batch manufacture only so much dilute solution as is to be dispensed into the specific vehicle at a given point in time (such as upon fueling up with diesel fuel). Variations on this approach are anticipated however. The system of the present invention may be structured and configured to provide a typical (average) one day supply of the AUS that may be held in a holding and dispensing tank for use during a given 24 hour period of time. Such an approach would still solve most of the problems associated with long term containment of a quantity of AUS and would still operate according to the basic principles described above in conjunction with the as needed batch mixing approach.

An alternative approach to providing the mixing tank 26, the sediment filtration system 28, and the station holding and dispensing tank 30, as shown in the embodiment of FIG. 1, would be to provide an in-line mixing structure that eliminates much of the need for intermediate tanks and filters. This alternative approach in the present invention envisions a unitary structure that provides a length (straight or coiled) of conduit, sized and structured sufficiently to provide the necessary turbulence, to fully mix the compounds dispensed into the conduit. This structure might be particularly appropriate for use where the concentrated urea is provided in the liquid (concentrated solution) form. Additionally, the system may include an in-line heater component that increases the temperature of the solution as it is mixed to improve the solubility of the urea. In any case, it is possible, depending up the control mechanisms and flow systems established within the AUS terminal, to substitute a direct mixing and dispensing structure for the system that incorporates the intermediate tanks as shown in FIG. 1.

Other features that may be incorporated into the overall system of the present invention as disclosed functionally in FIG. 1 include a dispensed solution quality verification component 29 that serves to sample and test the quality of the mixed batch of solution as it is being dispensed. Such a testing component could then is a printout in the form of a receipt that would include verification of the urea percentage in the solution as well as some measure of its purity. Various chemical testing devices and systems are known that could quickly and accurately report this information to purchaser of the AUS.

The system shown and described in FIG. 1 is preferably a closed system in that any residual solution that remains in the system is not subject to evaporation and therefore fouling of the flow lines, valves, and controls of the system. Alternately, the system could incorporate components and/or control procedures that would flush or purge the system either with pure water or pressurized air. In either case, measures would be taken to reduce the possibility of solid urea re-forming (as a result of evaporation) within the system and thereby clogging the flow lines and valves.

Figure 2:
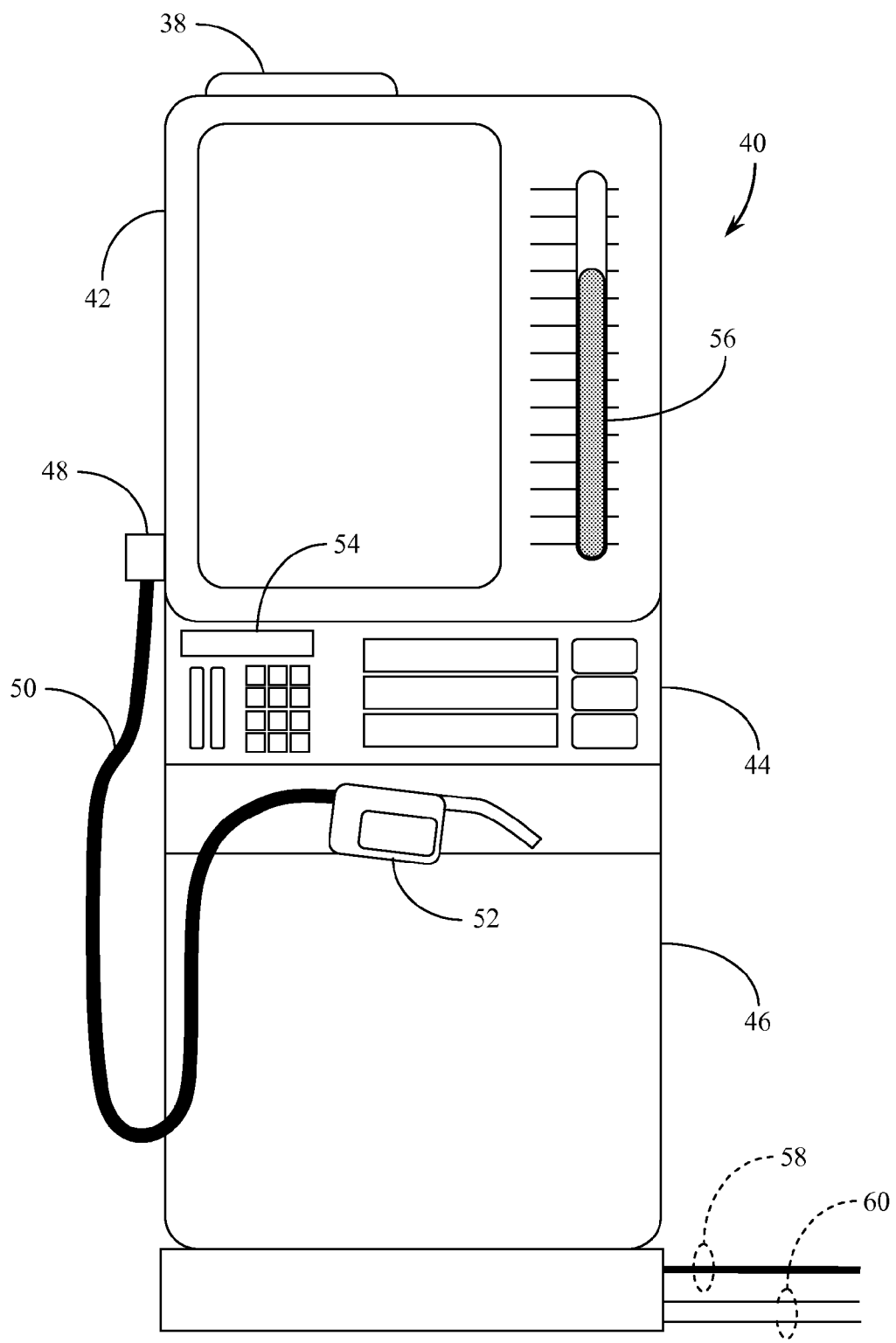
FIG. 2 is an elevational front view of a typical dispensing station having the components shown in FIG. 1 and configured for placement in conjunction with a fuel dispensing depot.

FIG. 2 provides an elevational view of an example of what a typical dispensing station comprising the components shown in FIG. 1 might necessarily include. This AUS terminal is configured for placement in conjunction with a typical fuel dispensing depot as described in more detail below with FIG. 3. The mixing/dispensing terminal 40 comprises primarily reservoir tank section 42, electronic control section 44, and terminal base support structure 46. Dispensing hose connector 48 along with dispensing hose 50 and dispensing nozzle 52 serve to deliver the quantity of AUS to the diesel powered vehicle.

The control of the overall system is carried out through the use of electronic control data input panel 54 with reference to dispensing tank level indicator 56. The terminal 40 is provided with connections to power and a water supply through external source electrical supply 58 and external source water supply 60.

Figure 3:
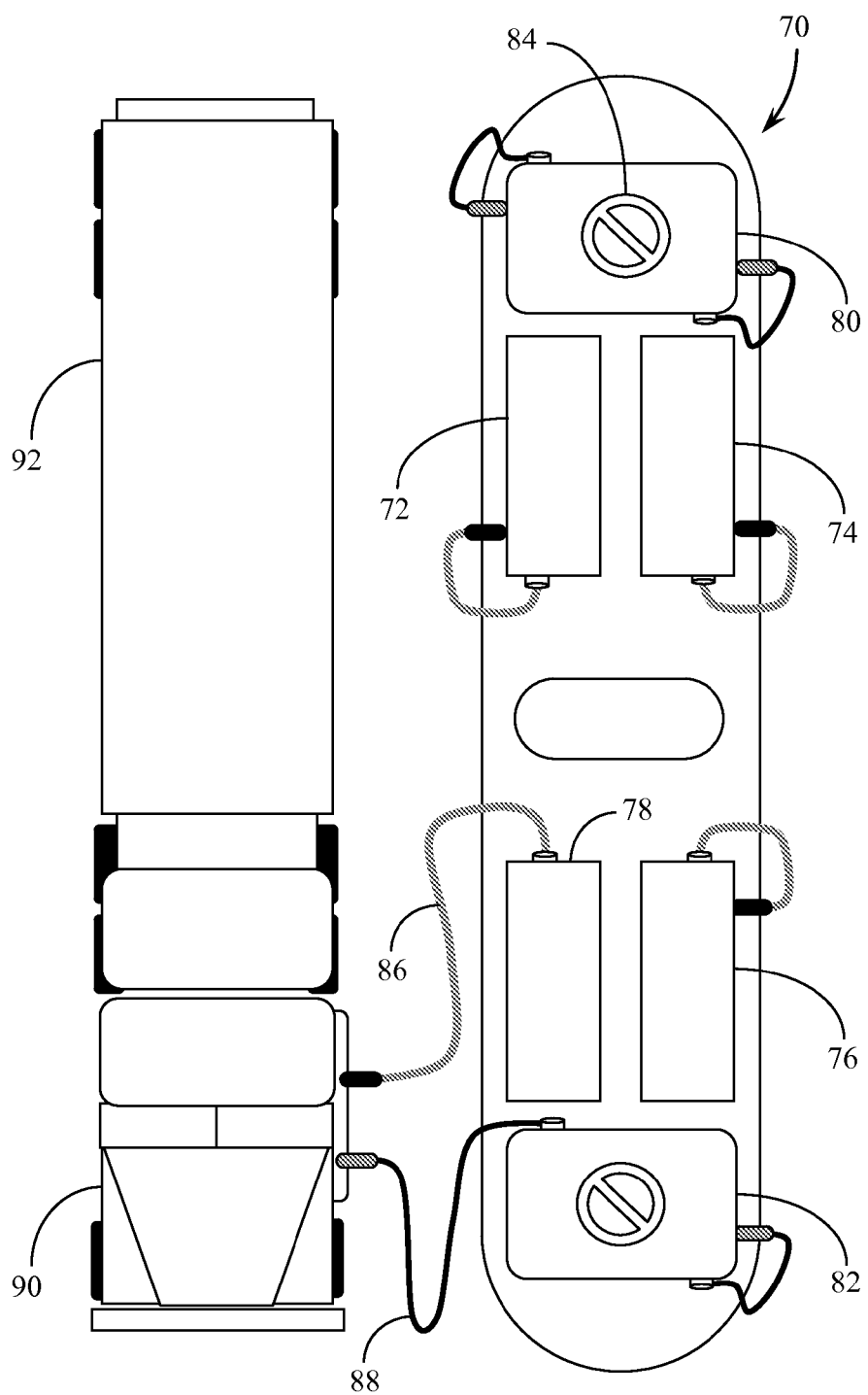
FIG. 3 is a top plan view of a typical dispensing depot with two of the systems of the present invention installed and positioned for the mixing and delivery of the reducing agent.

FIG. 3 is a top plan view of a typical diesel fuel dispensing depot with two of the systems of the present invention installed (each with two dispensing hoses) and positioned for the mixing and delivery of the reducing agent solution. In this view, diesel fuel depot island 70 includes a number of typical diesel fuel pumps 72-78. Added in this case are two AUS dispensing systems 80 & 82 positioned at either end of depot island 70. Those skilled in the art will recognize variations on this placement of the AUS terminals although convenience would suggest placement of the same in close proximity to the fuel pumps. Each of the AUS dispensing systems includes a urea reservoir access lid 84 which, in the preferred embodiment, provide the manner of refilling the terminal on a periodic basis.

Operationally, the diesel vehicle operator brings the vehicle, made up of diesel powered vehicle (tractor) 90 and diesel vehicle load (trailer) 92, adjacent the depot island 70 as would be typical for fueling. In this case, however, the vehicle operator would utilize not only diesel fuel dispensing hose 86 but also AUS dispensing hose 88. In this manner, the diesel vehicle operator may receive an amount of AUS appropriate to accommodate the corresponding amount of diesel fuel that is being dispensed. Although the preferred embodiment of the present invention anticipates independent control of the AUS dispensing system, it would also be possible to link the fuel dispensing system in such a manner that the appropriate amount (that corresponding to the amount of diesel fuel dispensed) is mixed and dispensed at the same time or immediately subsequent to the dispensing of the fuel.

Variations as to scale are anticipated with both the system and the method of the present invention. It is anticipated that in some environments (fleet managed service stations, for example) a very high volume of dispensed AUS might be required. In such circumstances, a very large holding and dispensing tank might be the preferred method for manufacturing large quantities of AUS at a time (for example, within a twenty-four hour period) with the knowledge that a major portion of the manufactured solution will be immediately dispensed into a large number of vehicles. Such a high volume system may include other features that promote the benefits of batch processing, and may further include individual sampling of the batch after it is manufactured for analysis and testing.

Likewise, there may be systems whose primary purpose is to replace the package market, whereby one and two liter containers of the solution might have been prepared and sold to individuals. A very small terminal with as needed mixing of the solution may be all that is required under such an environment. The system may, for example, be pre-set to generate one liter quantities of the solution at a time with little or no variation in the operational control that would direct greater or lesser quantities. Such a system may be simpler and more cost effective to manufacture and install in certain smaller locations. Such a system would easily replace the package market in that it would make it just as easy for the user to dispense the solution directly into the vehicle from the mixing terminal as it would be for the user to purchase a pre-made solution off the shelf in a retail outlet. The benefit, of course, is the elimination of the packaging associated with the one or two liter containers that would take up shelf space in the retail outlet. Other intermediate variations based on size are also anticipated depending upon the quantity of solution that would be expected to be required over a given period of time or the intermittent requirements associated with the dispensing solution into an entire fleet of trucks at the same time. The present invention anticipates these variations and encompasses all of them within the scope of the inventive system and method.

Although the present invention has been described in terms of the foregoing preferred embodiments, this description has been provided by way of explanation only, and is not intended to be construed as a limitation of the invention. Those skilled in the art will recognize modifications of the present invention that might accommodate specific fuel delivery environments, AUS compositions and fluid characteristics, as well as variations in the quantity of the AUS required at a given time. Such modifications, as to configuration and operational control, where such modifications are coincidental to the type and quantity of solution being mixed and dispensed, do not necessarily depart from the spirit and scope of the invention.

I claim:

1. A stationary delivery system for mixing and dispensing an aqueous urea solution to a movable diesel powered vehicle for storage and use on the vehicle, the delivery system comprising:
    (a) a stationary urea concentrate reservoir;
    (b) a metering urea dispenser connected to the stationary urea concentrate reservoir;
    (c) a stationary water reservoir;
    (d) a metering water dispenser connected to the water reservoir;
    (e) a stationary mixing tank connected to an output of the metering urea dispenser and an output of the metering water dispenser;
    (f) a stationary terminal holding and dispensing tank connected to an output of the mixing tank;
    (g) an aqueous urea solution dispenser connected to an output of the terminal holding and dispensing tank;
    (h) an operational control system;
    (i) a plurality of flow control valves and flow meters associated with the stationary reservoirs and tanks within the delivery system and operable by the operational control system;
    (j) a stationary support platform positioning and supporting the stationary delivery system as a fixed station unit, structured adjacent a stationary system for dispensing diesel fuel into the movable diesel powered vehicle, the stationary support platform accessible to the movable diesel powered vehicle to take delivery of the aqueous urea solution; and
    (k) a link between the aqueous urea solution delivery system and the diesel fuel dispensing system, such that an appropriate amount of aqueous urea solution, corresponding to an amount of diesel fuel dispensed, is mixed and dispensed.

2. The delivery system of claim 1 further comprising:
    (l) a sediment filtration system connected to an output of the mixing tank; and
    (m) a sample quality verification system connected to an output of the sediment filtration system.

3. The delivery system of claim 1 further comprising a dispensed solution quality verification component that samples and tests a quality of the aqueous urea solution being dispensed from the dispensing tank, and a reporting device for informing the user of the quality.

4. A method for mixing and dispensing an aqueous urea solution from a fixed station based delivery system to a tank positioned on a mobile diesel powered vehicle, the method comprising the steps of:
    (a) providing a fixed support platform for supporting the fixed station based delivery system, the fixed support platform approachable by the mobile diesel powered vehicle;
    (b) providing a stationary reservoir of concentrate urea on the fixed support platform;
    (c) providing an external source of water;
    (d) receiving water from the external water source into a stationary water reservoir on the fixed support platform;
    (e) metering a prescribed quantity of urea concentrate from the stationary urea concentrate reservoir;
    (f) metering a prescribed quantity of water from the stationary water reservoir;
    (g) mixing the prescribed quantity of urea concentrate and the prescribed quantity of water in a stationary mixing tank on the fixed support platform to form the aqueous urea solution;
    (h) storing the aqueous urea solution in a stationary holding and dispensing tank on the fixed support platform;
    (i) providing a plurality of flow control valves in association with the reservoir of concentrate urea, the external source of water, the water reservoir, the mixing tank, and the holding and dispensing tank;
    (j) controlling the plurality of flow control valves to carry out the method steps; and
    (k) dispensing the aqueous urea solution from the stationary holding and dispensing tank on the fixed support platform to the tank positioned on the mobile diesel powered vehicle;
    wherein the user initially dispenses a quantity of diesel fuel into the diesel powered vehicle, and the step of dispensing a metered quantity of aqueous urea solution from the holding and dispensing tank on the fixed support platform to a diesel powered vehicle further comprises the step of determining an appropriate amount of aqueous urea solution dispensed corresponding to the quantity of diesel fuel dispensed.

5. The method of claim 4 wherein the step of receiving water from the external water source further comprises the steps of:
 filtering the water; and
 storing the filtered water in the water reservoir on the fixed support platform.

6. The method of claim 4 wherein the step of mixing the prescribed quantity of urea concentrate and the prescribed quantity of water in a mixing tank further comprises the steps of:
 filtering the aqueous urea solution in the mixing tank through a sediment filtration system; and
 sampling and verifying a quality of the aqueous urea solution.

7. The method of claim 5 wherein the step of mixing the prescribed quantity of urea concentrate and the prescribed quantity of water in a mixing tank further comprises the steps of:
 filtering the aqueous urea solution in the mixing tank through a sediment filtration system; and
 sampling and verifying a quality of the aqueous urea solution.

\* \* \* \* \*